(12) United States Patent
Chen et al.

(10) Patent No.: US 10,680,998 B2
(45) Date of Patent: Jun. 9, 2020

(54) METHOD, SYSTEM, AND COMPUTER PROGRAM PRODUCT FOR A NETWORK DEVICE IN SWITCHLESS NETWORKS

(71) Applicant: International Business Machines Corporation, Armonk, NY (US)

(72) Inventors: Lior Chen, Jerusalem (IL); Gregory Etelson, Rehovot (IL); Constantine Gavrilov, Rishon-le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 440 days.

(21) Appl. No.: 14/937,221

(22) Filed: Nov. 10, 2015

(65) Prior Publication Data

US 2017/0134336 A1    May 11, 2017

(51) Int. Cl.
  *G06F 15/16*  (2006.01)
  *H04L 29/12*  (2006.01)

(52) U.S. Cl.
  CPC ........ *H04L 61/103* (2013.01); *H04L 61/6009* (2013.01)

(58) Field of Classification Search
  None
  See application file for complete search history.

(56) References Cited

U.S. PATENT DOCUMENTS

| | | | |
|---|---|---|---|
| 6,886,103 B1 | 4/2005 | Brustoloni et al. | |
| 7,792,113 B1 | 9/2010 | Foschiano et al. | |
| 8,396,062 B2 | 3/2013 | Takahashi | |
| 8,681,661 B2 | 3/2014 | Narasimhan et al. | |
| 2007/0110024 A1* | 5/2007 | Meier | H04L 45/04 370/351 |
| 2007/0248066 A1* | 10/2007 | Banerjea | H04L 45/26 370/338 |
| 2007/0286139 A1* | 12/2007 | Niu | H04L 45/26 370/338 |
| 2013/0151661 A1 | 6/2013 | Koponen et al. | |
| 2013/0332617 A1 | 12/2013 | Aoki et al. | |
| 2014/0071885 A1* | 3/2014 | Cherian | H04W 40/22 370/315 |

FOREIGN PATENT DOCUMENTS

CN    101056240 A  * 10/2007

OTHER PUBLICATIONS

NPL, Brocade ICX 6650, p. 6, Sep. 28, 2012 (Year: 2012).*
NPL, Web Document, How does gratuitous ARP work?, May 2, 2014 (Year: 2014).*
NPL, RFC 3561 AODV Routing, Perkins et al. Jul. 2003 (Year: 2003).*

(Continued)

*Primary Examiner* — Padma Mundur
(74) *Attorney, Agent, or Firm* — Rabindranath Dutta; Konrad Raynes Davda & Victor LLP

(57) ABSTRACT

Communication of a node is maintained in a switchless network via point-to-point connections of a plurality of nodes having a plurality of ports. Address Resolution Protocol (ARP) announces are performed, via a virtual network device of the node, periodically or in response to an occurrence of a change in the node, for communications among the plurality of nodes in the switchless network.

12 Claims, 10 Drawing Sheets

(56) References Cited

OTHER PUBLICATIONS

NPL, Gratuitous ARP, The Wireshark Wiki, Jul. 25, 2014 (Year: 2014).*
Ganapathy et al., "Design of a Network Service Architecture", dated 2007, Department of Electrical and Computer Engineering, University of Massachusetts, Amherst, MA USA, Total 6 pages.
"Network Security Using NAT and NAPT" dated 2002, Matt Smith, Hindin Communications, Department of Computer Science, University of Canterbuly, New Zealand, Total 6 pages.

* cited by examiner

METHOD, SYSTEM, AND COMPUTER PROGRAM PRODUCT FOR A NETWORK DEVICE IN SWITCHLESS NETWORKS

BACKGROUND

1. Field

Embodiments relate to a method, system, and computer program product for a network device in switchless networks.

2. Background

In a computer network a plurality of devices may communicate with a plurality of other devices. In many situations the devices are interconnected via a plurality of switches, where a switch is a computer networking device that connects the plurality of devices together in a computer network, by using packet switching to receive, process and forward data from a source device to the destination device via zero or more intermediate devices. Therefore, the switches may logically configure communication links between the plurality of devices with physical links being located between the switch and each device. Such a network that uses switches may be referred to as a switched computer network.

In contrast, in switchless computer networks, the plurality of devices are connected via dedicated links that do not includes switches. A device may receive a packet from one device and forward the packet to another device. As a result, a source device may be able to communicate with a destination device in switchless computer networks via intermediate devices.

The Address Resolution Protocol (ARP) is a networking protocol used for resolution of network layer addresses into link layer addresses, a critical function in multiple-access networks. It is also the name of a program for manipulating these addresses in many operating systems. ARP is used for converting a network address like Internet Protocol (IP) address to a physical address like an Ethernet address. A host may broadcast an ARP request onto a network to obtain a physical address.

SUMMARY OF THE PREFERRED EMBODIMENTS

Provided are a method, a system, and a computer program product in which communication of a node is maintained in a switchless network via point-to-point connections of a plurality of nodes having a plurality of ports. Address Resolution Protocol (ARP) announces are performed, via a virtual network device of the node, periodically or in response to an occurrence of a change in the node, for communications among the plurality of nodes in the switchless network.

In additional embodiments, each node of the plurality of nodes has an ARP cache of network addresses, wherein an ARP entry includes at least a hop count.

In yet additional embodiments, the ARP entry additionally includes an iteration number and a destination port.

In further embodiments, ARP requests are avoided, wherein the change in the node that causes the performing of the APP announces comprise at least one of a port down event, a port up event, or a boot event.

In yet further embodiments, an announcer of the ARP announce sets the hop count to zero, and each subsequent ARP announce increments the iteration number by one, wherein the ARP announces are also performed in response of other ARP announces that signal a node change, to inform changed nodes about paths to local addresses.

In certain embodiments, the virtual network device is a first virtual network device, wherein the node is a first node. The first virtual network device of the first node transmits an unicast send message to a destination port of a second node found in an ARP entry, in response to locating a destination address in an ARP cache of the first node. In response to receiving the unicast send message, by a second virtual network device of the second node, if the destination address is local to the second node, then the second virtual device of the second node forwards the unicast send message to a network layer of the second node. In response to receiving the unicast send message, by the second virtual network device of the second node, if the destination address is not local then the unicast send message is forwarded to another destination port of a third node.

In additional embodiments, the virtual network device is a first virtual network device, wherein the node is a first node, wherein each node of the plurality of nodes has a multicast cache of multicast addresses to handle multicast messages, and loops are avoided in handling of the multicast messages via an iteration number associated with the multicast addresses. A multicast send is performed by the first virtual network device of the first node, by updating a first multicast cache of the first node and incrementing the iteration number, and transmitting the multicast send over all local ports of the first node. In response to receiving, the multicast send by the second node, if an entry is found in a second multicast cache of the second node that the iteration of the message has already been received, then the processing of the received multicast send is stopped, In response to receiving, the multicast send by the second node, if no entry is found in the second multicast cache of the second node that the iteration of the message has already been received, then an entry in the second multicast cache updated, the multicast send is passed to a network layer of the second node, and the multicast send is forwarded over all other ports of the second node.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments, computer networks may be implemented without switches, using point-to-point connections of nodes having a plurality of ports for communication. It may be desirable to implement such switchless computer networks in certain embodiments, if the number of nodes in the network are not too many and if the cost of switches is relatively high. Certain embodiments implement such a switchless network as a transparent network from the viewpoint of applications, by performing Address Resolution Protocol (ARP) announces rather than ARP requests, via a virtual network device of a node, where the virtual network device aids in the transmitting and receiving of packets. As a result, a plurality of nodes are enabled to communicate in the switchless network.

In certain embodiments, the ARP announces that are used for communication in switchless networks take considerably less time and resources than on-demand ARP requests and routing rules. The ARP announces include new fields for hop counts and iteration numbers and are used by ARP cache.

The virtual network device extends the ARP protocol with the two additional fields: hop count and iteration number. In certain embodiments, no ARP requests are made. ARP announces are performed when a node change happens and can also be performed periodically or be sent in response of other ARP announces that signal a node change. ARP announces are sent to announce a single address. Each next ARP announce for a given node increments the iteration number field by one. The announcer of the ARP announce sets hop count to zero. Each node implements an ARP cache of network addresses, where the ARP entry contains at least the hop count, the iteration number and the identity of the destination port.

Exemplary Embodiments

Figure 1:
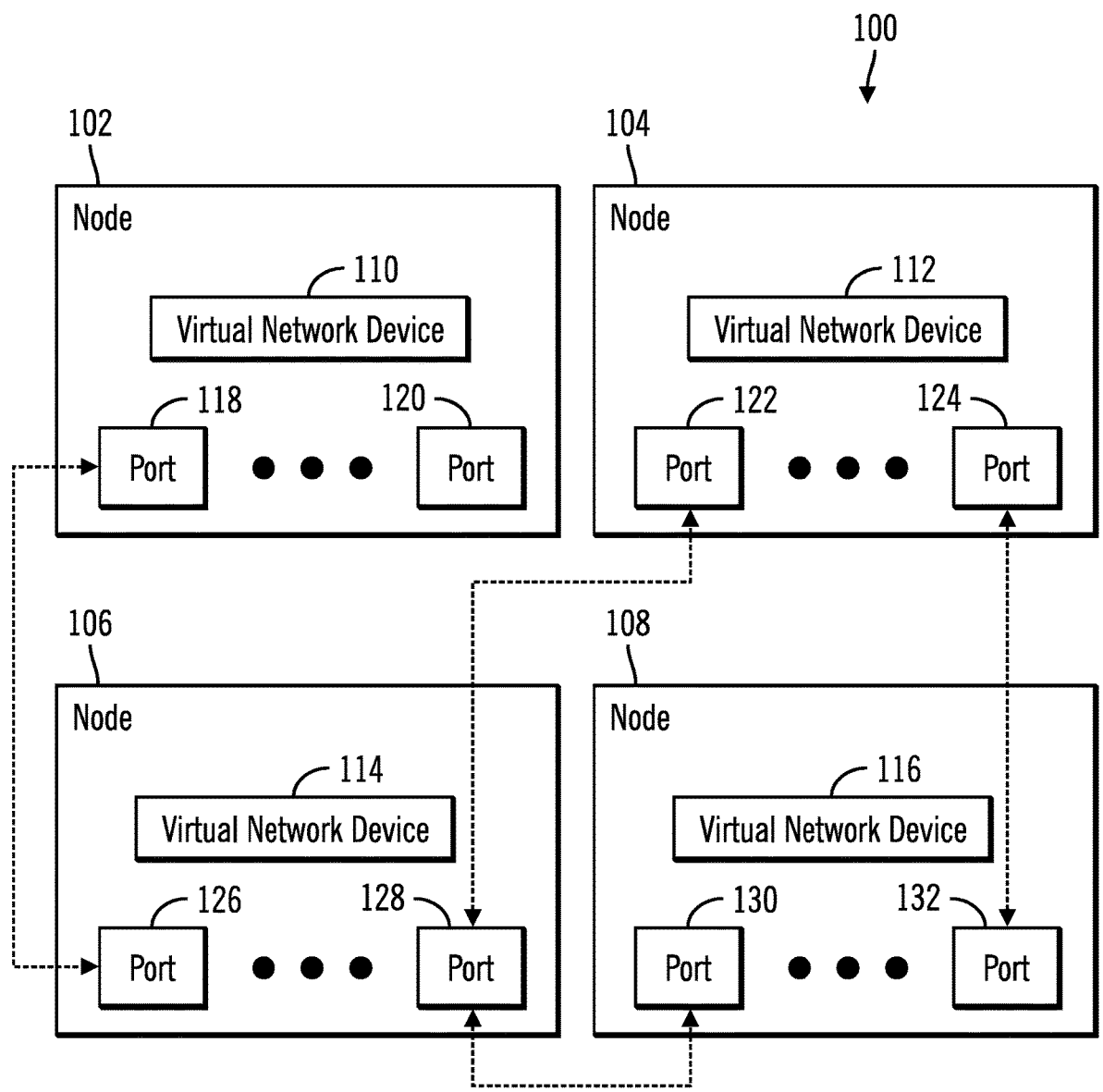
FIG. 1 illustrates a block diagram of a computing environment comprising a plurality of nodes coupled in a switchless network, in accordance with certain embodiments.

FIG. 1 illustrates a block diagram of a computing environment 100 comprising a plurality of nodes 102, 104, 106, 108 that are coupled in a switchless network, in accordance with certain embodiments. While in FIG. 1 only four nodes 102, 104, 106, 108 are shown, in alternative embodiments there may be a fewer or a greater number of nodes.

Each node may comprise any suitable computational device including those presently known in the art, such as, a personal computer, a workstation, a server, a mainframe, a hand held computer, a palm top computer, a telephony device, a network appliance, a blade computer, a processing device, a controller, etc. The nodes may be elements in any suitable network that is switchless. The switchless network is a network that does not rely on switches to direct or transmit packets. In certain embodiments, the nodes 102, 104, 106, 108 may be elements in a cloud computing environment.

The plurality of nodes 102, 104, 106, 108 may include virtual network devices 110, 112, 114, 116 as shown in FIG. 1. Each virtual network device 110, 112, 114, 116 provides transmit and receive routines in kernel or user-space for communicating packets between the plurality of nodes 102, 104, 106, 108. The ARP handling of such virtual network devices is internal and hidden from the kernel layer. In certain embodiments, the virtual network device 110, 112, 114, 116 may be implemented in software, firmware, hardware or any combination thereof.

Each node includes a plurality of ports, such as ports 118, 120, 122, 124, 126, 128, 130, 132. In FIG. 1, port 118 is shown in communication with port 126, port 122 with port 128, port 128 with port 130, and port 124 with port 132. The communication between any two ports is controlled via the virtual network devices in the computing environment 100.

Figure 2:
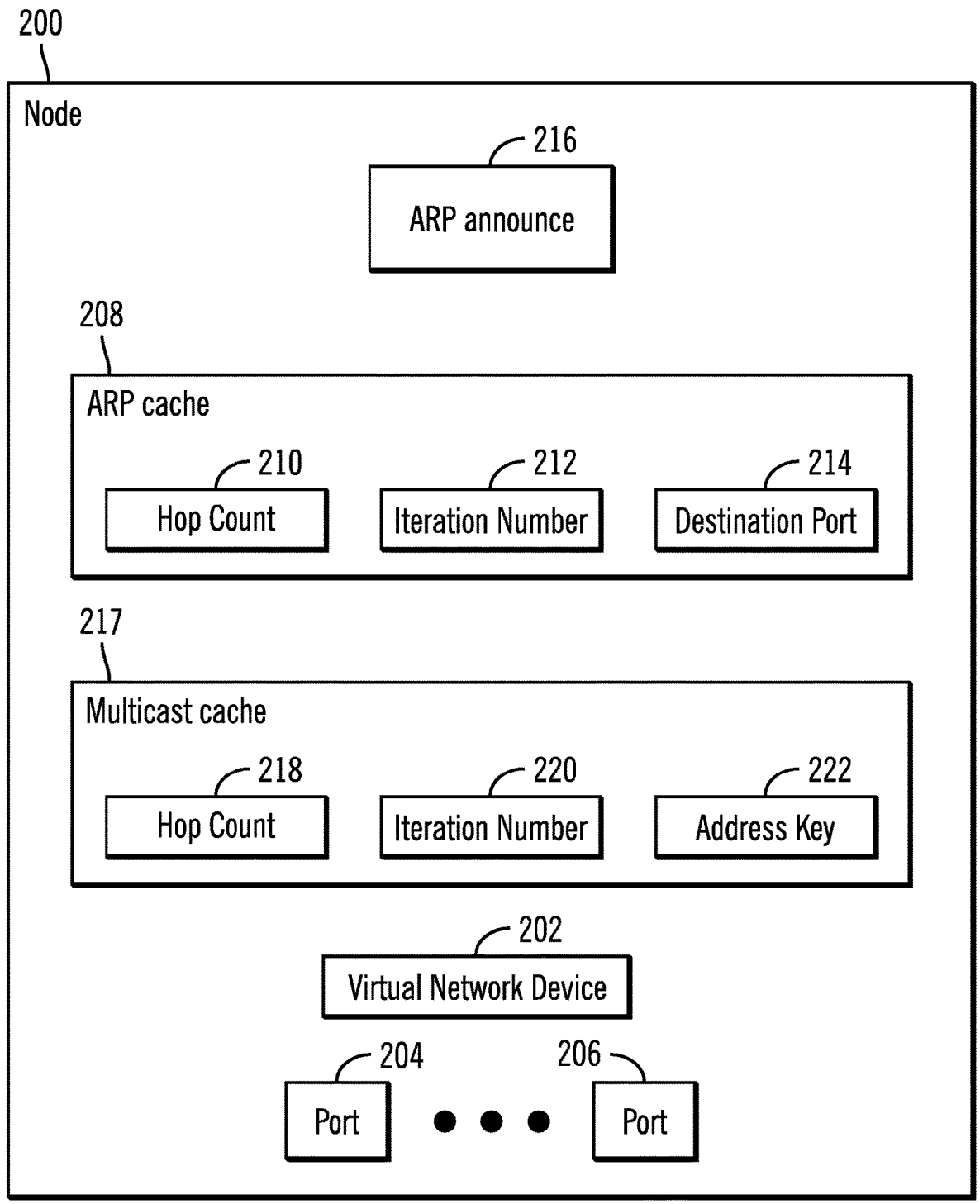
FIG. 2 illustrates a block diagram of a node, in accordance with certain embodiments.

FIG. 2 illustrates a block diagram of a node 200, in accordance with certain embodiments. The node 200 may include a virtual network device 202 and a plurality of ports 204, 206. The node 200 may include an ARP cache 208 that comprises a section of memory. The ARP cache 208 may include ARP entries including a hop count 210, an iteration number 212, and a destination port 214. The virtual network device 202 may be configured to make ARP announces 216 as shown in FIG. 2.

In certain embodiments, the virtual network device 202 extends the ARP protocol with the two additional fields: the hop count 210 and the iteration number 212. In certain embodiments, the virtual network device 202 does not generate any ARP requests, but instead generates ARP announces 216.

ARP announces 216 are generated when a change occurs in the node 200. For example, a change in the node 200 may include a port up or a port down event in or a booting event. The ARP announces 216 may also be generated periodically to avoid loss of data packets, if the switchless network in which the node 200 is included is not reliable. The ARP announces 216 may also be sent in response of other ARP announces from other nodes such as nodes 102, 104, 106, 108 if node 200 is part of the same switchless network as nodes 102, 104, 106, 108. The ARP announces 216 may signal a node change.

In certain embodiments, the ARP announces 216 are sent to announce a single address. Each next announce for a given node increments the iteration number 212 by one. The announcer also sets the hop count 210 to zero. In certain embodiments, each node implements in ARP the cache 208 at least the hop count 210, the iteration number 212, and the destination port 214.

In certain embodiments, each node 200 has a multicast cache 217 of multicast addresses to handle multicast messages, and loops are avoided in handling of the multicast messages via an iteration number 220, where the iteration number 220 may be stored in the entries of the multicast cache 217 in association with hop counts 218 and address keys 222 that are a defined by a combination of source unicast address and destination multicast address.

Figure 3:
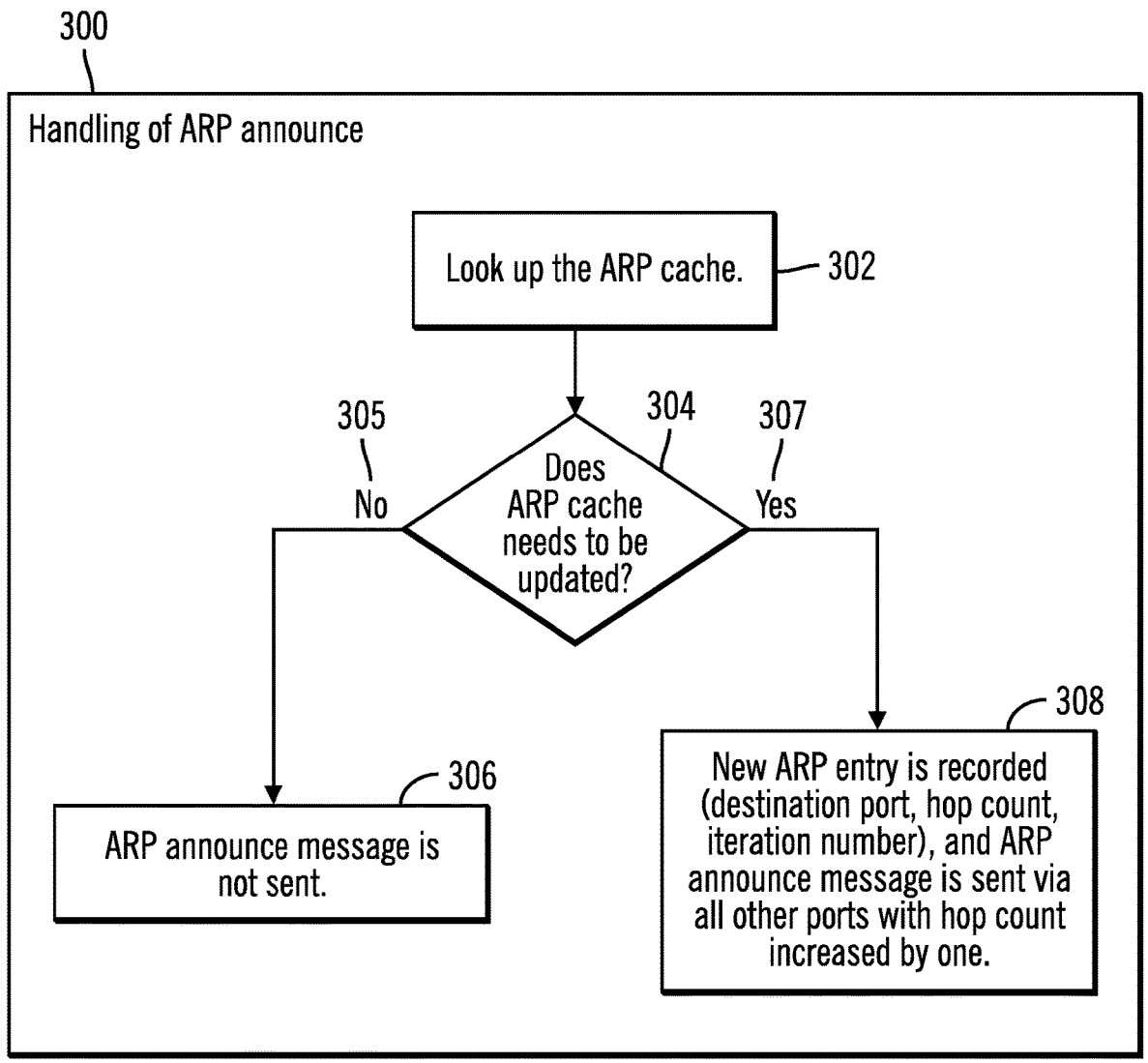
FIG. 3 illustrates a flowchart that shows the handling of an ARP announce, in accordance with certain embodiments.

FIG. 3 illustrates a flowchart 300 that shows the handling of an ARP announce, in accordance with certain embodiments.

Handling of ARP announces is done as follows by any of the nodes, such as node 200, 102, 104, 106, 108. Control starts at block 302, in which the virtual network device 202 looks up the ARP cache 208 and determines (at block 304) whether the ARP cache 208 needs to be updated. If so ("No" branch 305), then control proceeds to block 306 in which the ARP announce message is not sent.

If at block 304, a determination is made that the ARP cache 208 needs to be updated ("Yes" branch 307) then control proceeds to block 308. The ARP cache 208 may need updating if one of the following conditions are met: address not found, address found with older iteration number, address found with the same iteration number but the hop count is greater.

At block 308, the new ARP entry is recorded, where the new ARP entry includes the destination port, the hop count, and the iteration number, and the ARP announce message is sent via all other ports with the hop count 210 increased by one.

Figure 4:
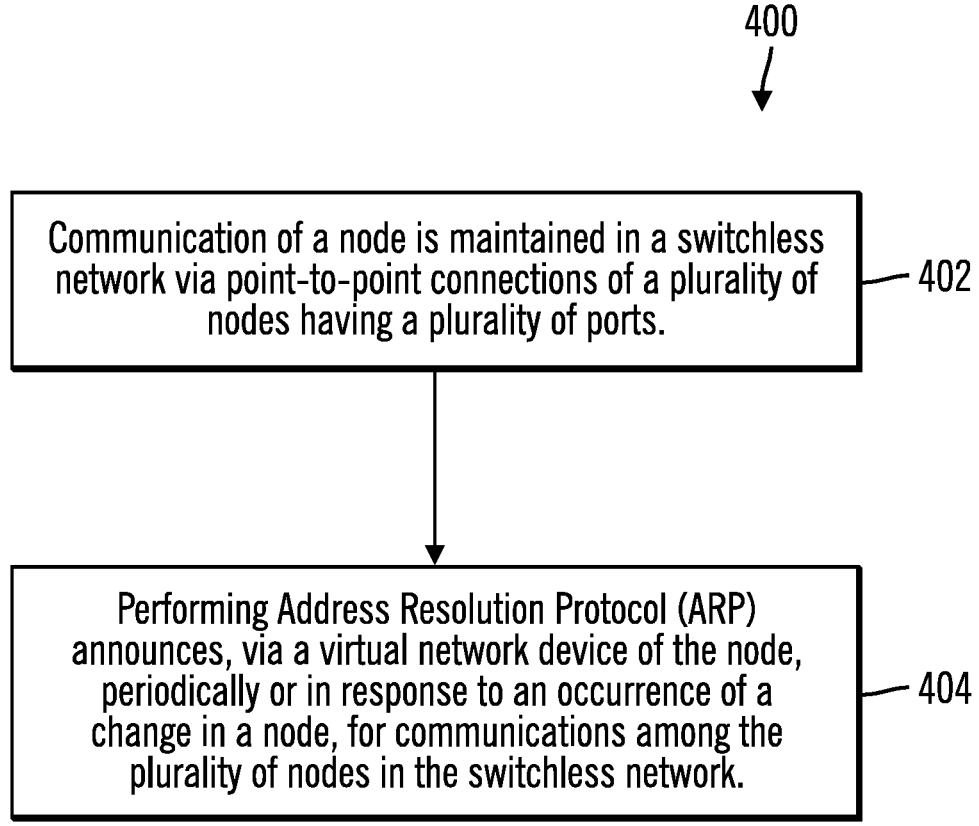
FIG. 4 illustrates a flowchart that shows operations to perform ARP announces for communication among a plurality of nodes of a switchless network, in accordance with certain embodiments.

FIG. 4 illustrates a flowchart 400 that shows operations to perform ARP announces for communication among a plurality of nodes 102, 104, 106, 108, 200 of a switchless network, in accordance with certain embodiments. Control starts at block 402 in which communication of a node is maintained in a switchless network via point-to-point connections of a plurality of nodes 102, 104, 106, 108, 200 having a plurality of ports. Address Resolution Protocol (ARP) announces 216 are performed (at block 404) via a virtual network device 202 of the node (e.g. node 200), periodically or in response to an occurrence of a change in a node 200, for communications among the plurality of nodes in the switchless network. The change in the node that causes the performing of the APP announces comprise at least one of a port down event, a port up event, or a boot event.

In additional embodiments, each node of the plurality of nodes 102, 104, 106, 108 has an ARP cache of network addresses, wherein an ARP entry includes at least a hop count 210. The ARP entry additionally includes an iteration number 212 and a destination port 214. In further embodiments, ARP requests that are relatively more time consuming and resource intensive in comparison to ARP announces are avoided. An announcer of the ARP announce sets the hop count to zero, and each subsequent ARP announce increments the iteration number by one, where the ARP announces are also performed in response of other ARP announces that signal a node change to inform changed nodes about local addresses.

Figure 5:
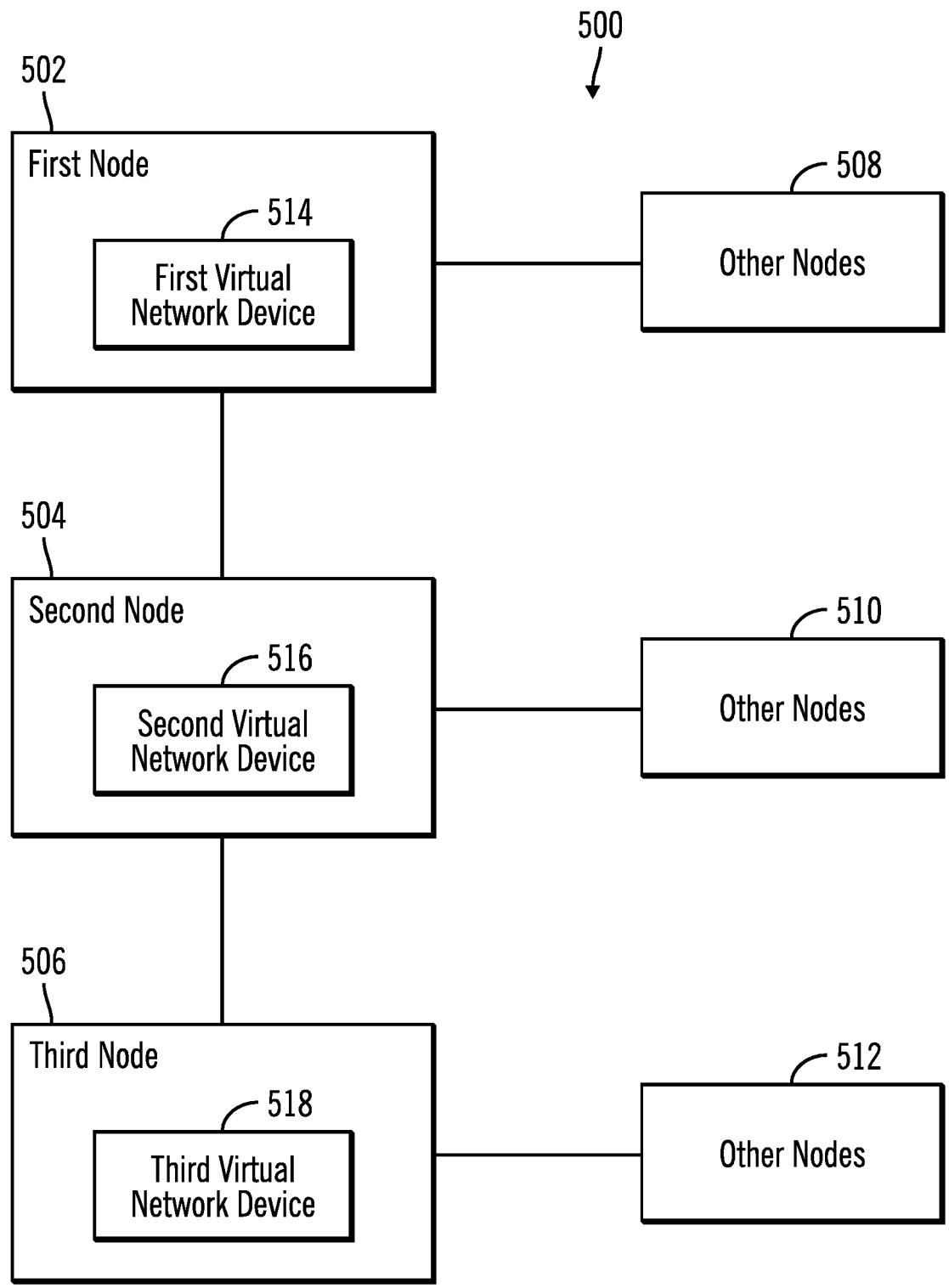
FIG. 5 illustrates a block diagram of a first, a second, and a third node coupled to a plurality of other nodes in a switchless network, in accordance with certain embodiments.

FIG. 5 illustrates a block diagram 500 of a first node 502, a second node 504, and a third node 506 coupled to a plurality of other nodes 508, 510, 512 in a switchless network, in accordance with certain embodiments.

The first node 502 includes a first virtual network device 514, the second node 504 includes a second virtual network device 516, and the third node includes a third virtual network device 518. In certain embodiments, a port of the first node 502 is in communication with a port of the second node 504, and a port of the second node 504 is in communication with a port of the third node 506. Packets from the first node 502 are send to the third node 506 via the second node 504.

Figure 6:
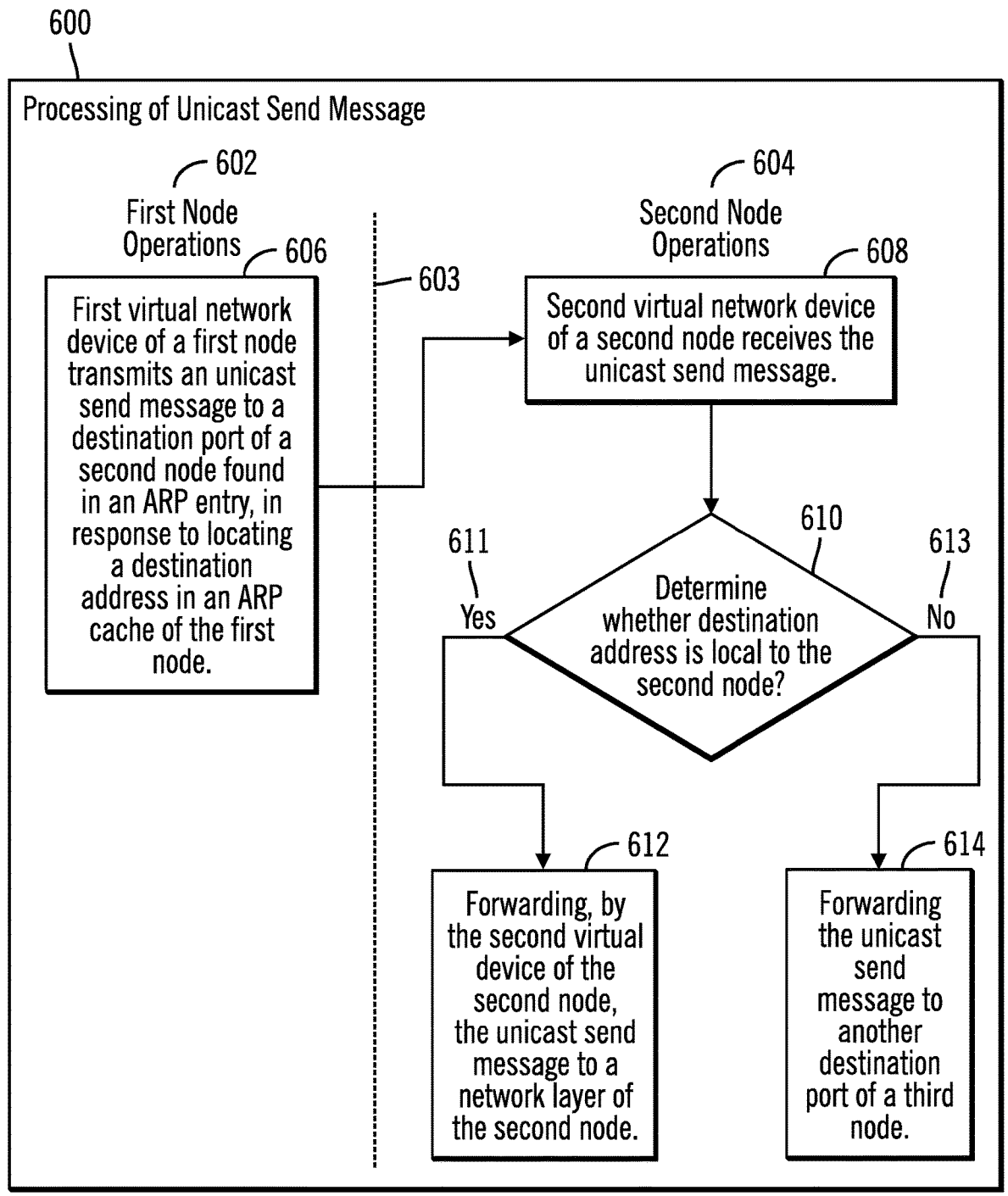
FIG. 6 illustrates a flowchart that shows the processing of unicast send messages, in accordance with certain embodiments.

FIG. 6 illustrates a flowchart 600 that shows the processing of unicast send messages, in accordance with certain embodiments. Unicast is the term used to describe communications where packets are sent from one point to another point. In unicasting there is one sender and one receiver. In FIG. 6, the first node operations 602 (i.e., operations of the first node 502) are shown to the left of the dashed line 603, and the second node operations 604 (i.e., operations of the second node 504) are shown to the right of dashed line 603.

The first virtual network device 514 of the first node 502 transmits (at block 606) an unicast send message to a destination port of a second node 504 found in an ARP entry, in response to locating a destination address in an ARP cache of the first node 502. In response to receiving (at block 608) the unicast send message, by a second virtual network device 516 of the second node 504, a determination is made (at block 610) as to whether the destination address is local to the second node 504.

If at block 610, it is determined that the destination address is local to the second node 504 ("Yes" branch 611), then the second virtual device 516 of the second node 504 forwards (at block 612) the unicast send message to a network layer of the second node 504.

If at block 610, it is determined that the destination address is not local to the second node 504 ("No" branch 613), then the unicast send message is forwarded (at block 614) to another destination port of a third node 506.

Therefore, unicast send messages are handled by a lookup of destination address in ARP cache. If the destination address is not found, then the message is dropped. If the destination address is found, then the message is sent to the destination port found in the ARP entry.

Unicast receive is performed by examining the destination address. If the destination address is local then the message is passed to the network later on. Otherwise, the message is handled as a unicast send request.

Figure 7:
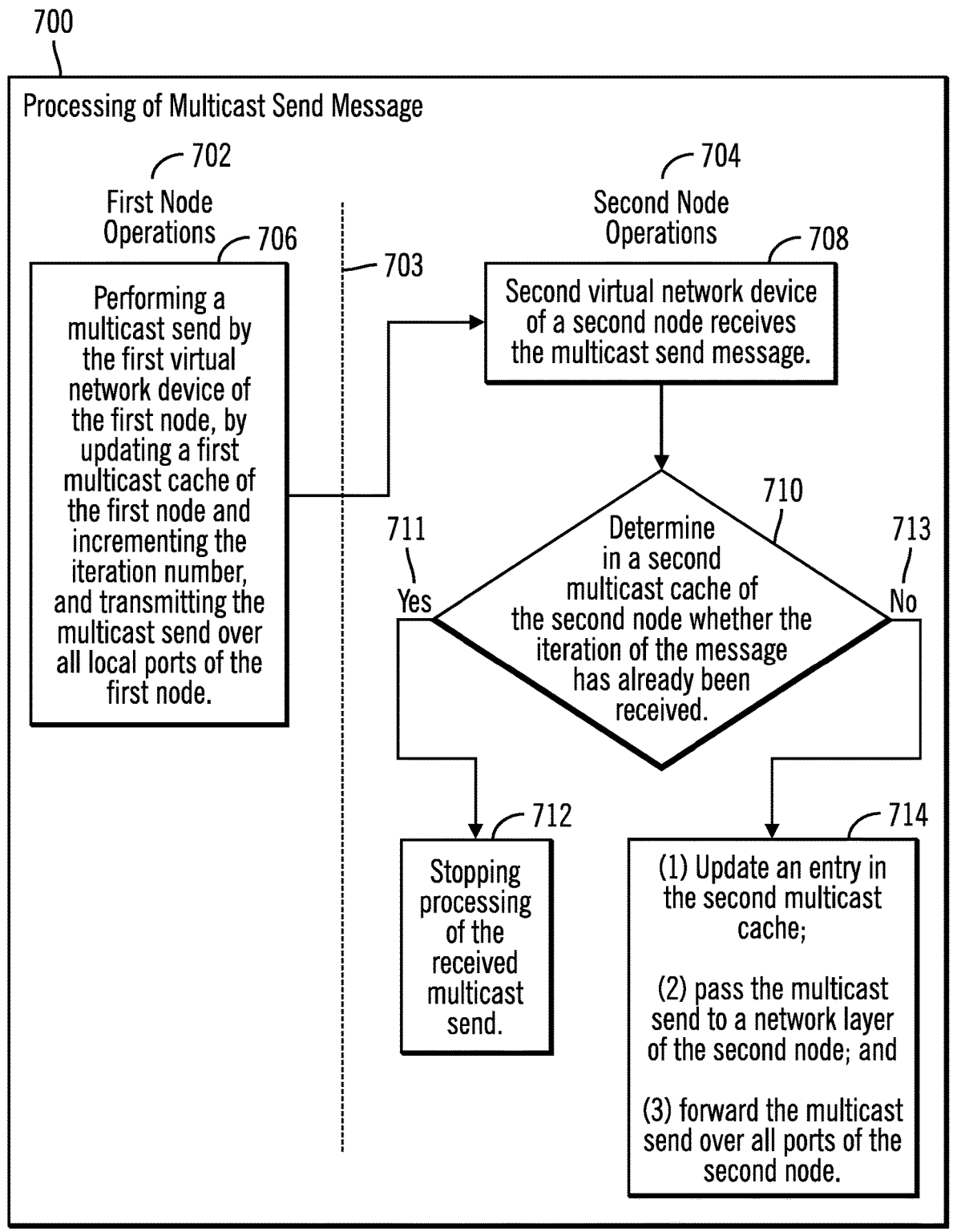
FIG. 7 illustrates a flowchart that shows the processing of multicast send messages, in accordance with certain embodiments.

FIG. 7 illustrates a flowchart 700 that shows the processing of multicast send messages, in accordance with certain embodiments. Multicast is the term used to describe communications where packets are sent from one or more points to a set of other points. Multicasting is the networking technique of delivering the same packet simultaneously to a group of clients/nodes. In FIG. 7, the first node operations 702 (i.e., operations of the first node 502) are shown to the left of the dashed line 703, and the second node operations 704 (i.e., operations of the second node 504) are shown to the right of dashed line 703.

Control starts at block 706 in which a multicast send is performed by the first virtual network device 514 of the first node 502, by updating a first multicast cache of the first node 502 and incrementing the iteration number, and transmitting the multicast send over all local ports of the first node 502. In response to receiving (at block 708), the multicast send by the second node 504, a determination is made as to whether an entry is found in a second multicast cache of the second node 504 to indicate that the iteration of the message has already been received.

If at block 710, a determination is made that the an entry is found in the second multicast cache of the second node 504 indicating that the iteration of the message has already been received ("Yes" branch 711), then the processing of the received multicast send is stopped (at block 712).

If no entry is found in the second multicast cache of the second node 504 that the iteration of the message has already been received ("No" branch 713 from block 710), then control proceeds to block 714 in which the entry in the second multicast cache is updated, the multicast send is passed to a network layer of the second node 504, and the multicast send is forwarded over all ports of the second node 504 for sending to other nodes.

To avoid multicast loops, multicast messages are extended to contain iteration number. Iteration number may be per unicast sender address or per pair of unicast sender address and destination multicast address. Each node implements a cache of multicast addresses, the entries in the cache including at least the iteration number (or an index of bitmap that specifies the last N iteration numbers that have been seen).

The handling of multicast sends is performed as follows:
(1) Update the entry in multicast cache, incrementing the iteration number; and
(2) Send message over all local ports.

The handling of multicast receive messages is done as follows:
(1) Look for entry in multicast cache. If entry is found and iteration is marked as already received, ignore the message; and
(2) Otherwise, update entry in multicast cache, pass the packet to the network layer, and send the message over all other ports.

Therefore FIGS. 1-7 illustrate certain embodiments in which ARP announces are used for communication in switchless networks rather than on-demand ARP requests and routing rules that take considerably more time and resources than ARP announces. The ARP announces include new fields for hop counts and iteration numbers and are used in ARP cache. Also, multicast cache that allows transparent multicast communication in a switchless network avoiding loops is presented. Presented embodiments show implementations of a self-healing (or self-correcting) network, where new paths are discovered via ARP announces when changes happen without a need to set up new routing rules.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
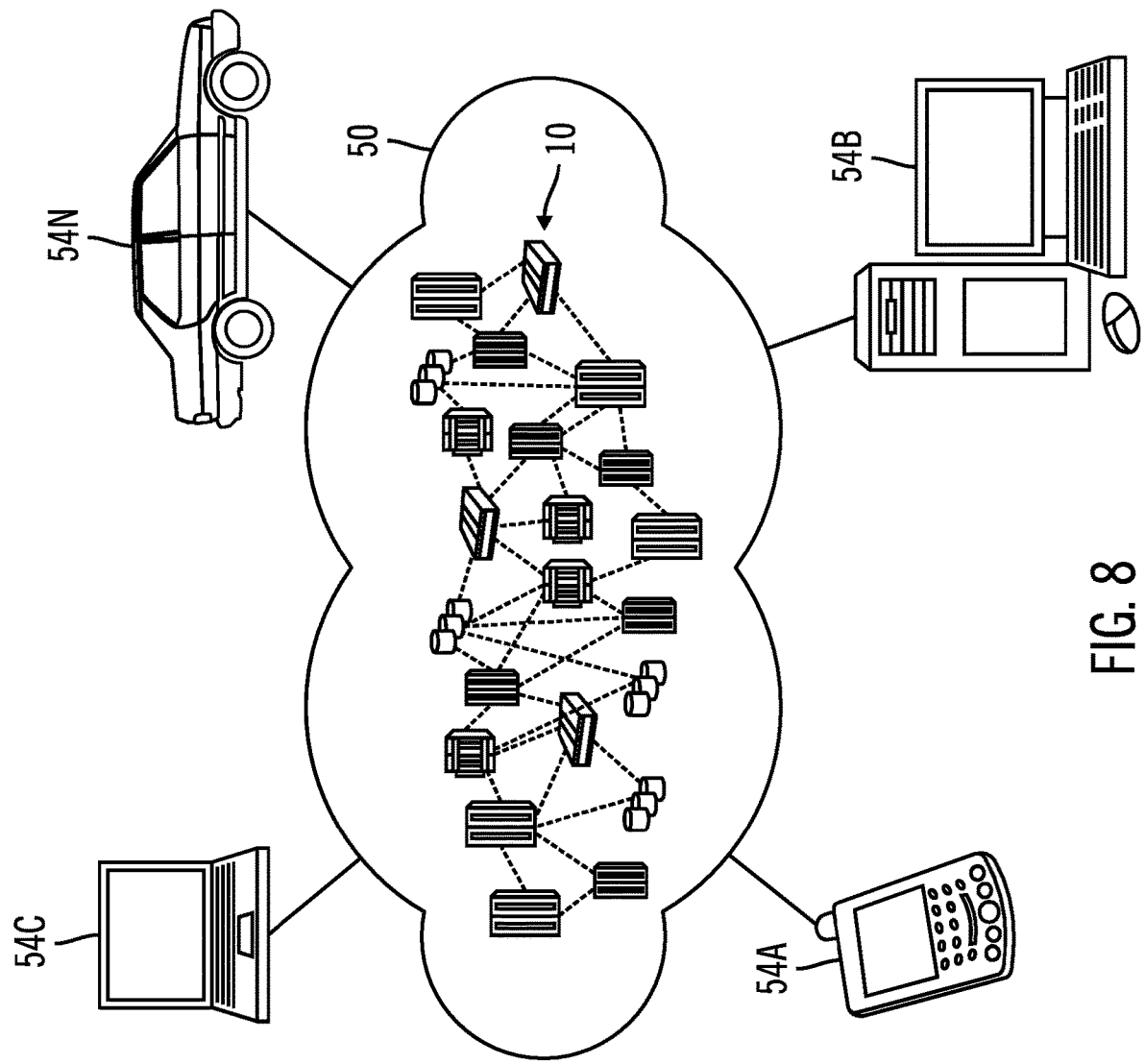
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
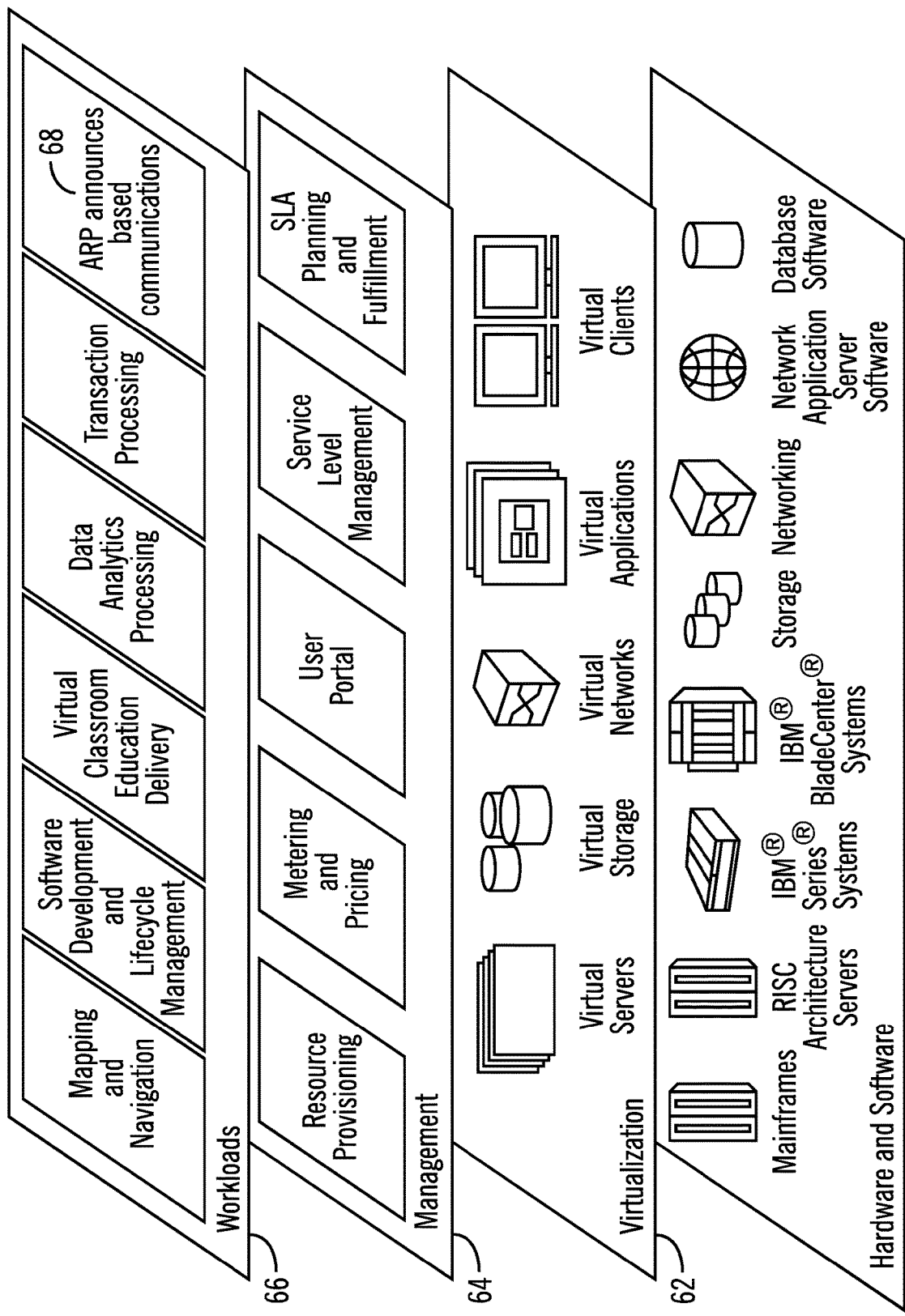
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the ARP announces based communications as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
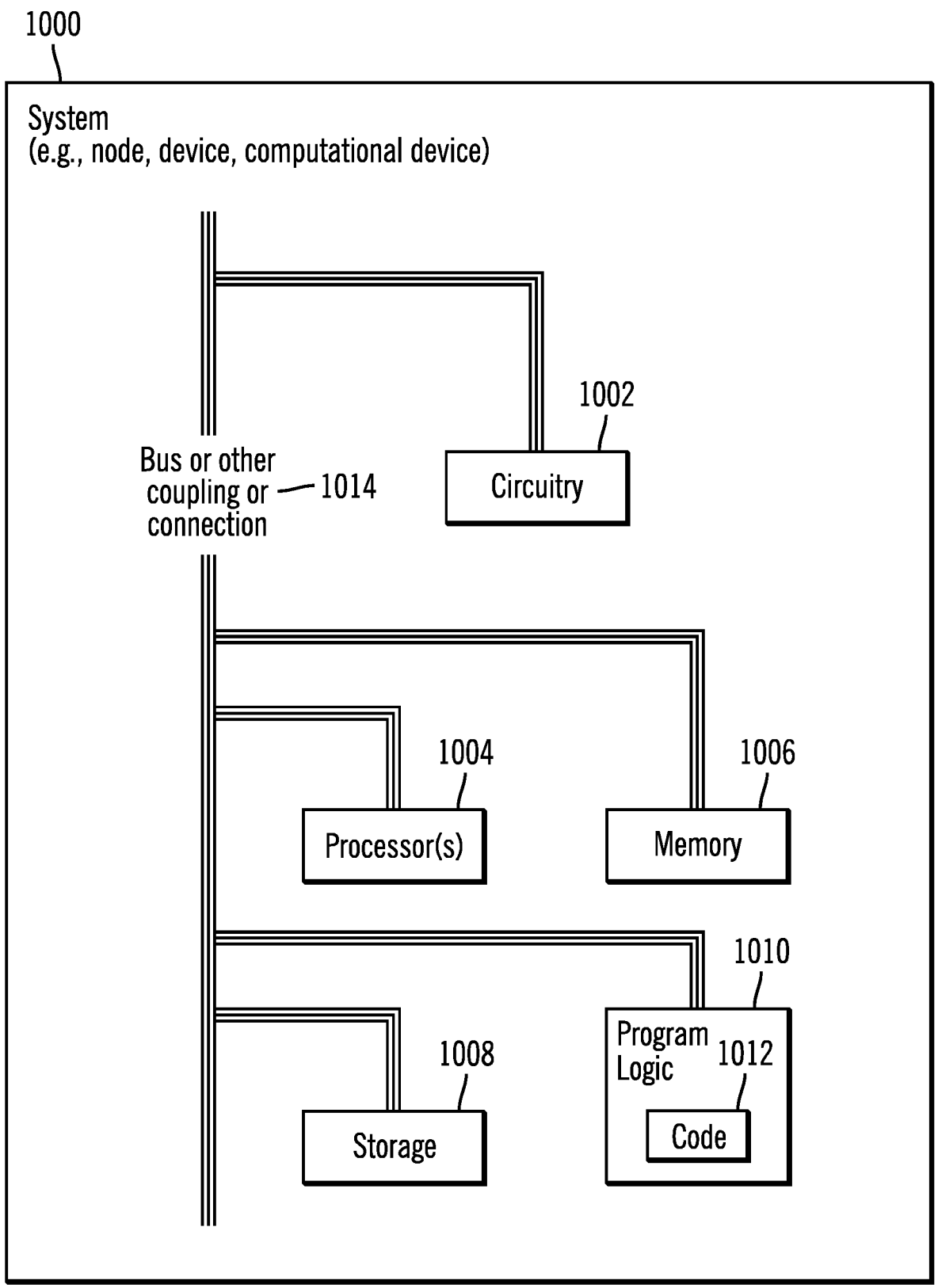
FIG. 10 illustrates a block diagram of a computational system that shows certain elements that may be included in one or more nodes, as described in FIGS. 1-9, in accordance with certain embodiments.

FIG. 10 illustrates a block diagram that shows certain elements that may be included in the nodes 102, 104, 106, 108, 200 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
executing a computer program that includes a first field that denotes a hop count and a second field that denotes an iteration number in an Address Resolution Protocol (ARP) entry of an ARP protocol, wherein the ARP entry in which the first field that denotes the hop count and the second field that denotes the iteration number are included also includes a third field that denotes a destination port;
maintaining communication of a node in a switchless network via point-to-point connections of a plurality of nodes having a plurality of ports; and
performing ARP announcements, via a virtual network device of the node, periodically or in response to an occurrence of a change in the node, for communications among the plurality of nodes in the switchless network, by:
populating data in the first field that denotes the hop count in an ARP entry maintained in an ARP cache that comprises a section of a memory of the node, wherein an announcer of an ARP announcement sets the hop count to zero;
populating data in the second field that denotes the iteration number in the ARP entry maintained in the ARP cache that comprises the section of the memory of the node, wherein each next ARP announcement increments the iteration number by one;
populating data in the third field that denotes the destination port in the ARP entry maintained in the ARP cache that comprises the section of the memory of the node, wherein each ARP announcement is sent to a single network address, and wherein ARP requests are not performed for communications among the plurality of nodes;
determining by the virtual network device that the ARP cache needs to be updated; and
in response to determining by the virtual network device that the ARP cache needs to be updated, recording a new ARP entry in which the new ARP entry includes the destination port, the hop count and the iteration number, and an ARP announcement is sent to all other ports with the hop count increased by one, wherein the virtual network device is a first virtual network device, wherein the node is a first node, wherein each node of the plurality of nodes has in addition to the ARP cache, a multicast cache of multicast addresses to handle multicast send messages, and loops are avoided in handling of the multicast send messages via an iteration number associated with the multicast addresses, and wherein handling of multicast send messages while performing the ARP announcements comprises:

performing a multicast send message comprising a packet by the first virtual network device of the first node, by updating a first multicast cache of the first node and incrementing the iteration number, and transmitting the multicast send message over all local ports of the first node;

in response to receiving, the multicast send message by a second node, if an entry is found in a second multicast cache of the second node that the iteration of the multicast send message has already been received, then stopping processing of the received multicast send message; and in response to receiving, the multicast send message by the second node, if no entry is found in the second multicast cache of the second node that the iteration of the multicast send message has already been received, then updating an entry in the second multicast cache, passing the multicast send to a network layer of the second node, and forwarding the multicast send message over all other ports of the second node.

2. The method of claim 1, wherein the change in the node that causes the performing of the ARP announcements comprise at least one of a port down event, a port up event, or a boat event.

3. The method of claim 2, wherein the ARP announcements are also performed in response of other ARP announcements that signal a node change, to inform changed nodes about paths to local addresses.

4. The method of claim 1, wherein handling of unicast send messages while performing the ARP announcements comprises:

transmitting by the first virtual network device of the first node, an unicast send message comprising a packet to a destination port of a second node found in an ARP entry, in response to locating a destination address in an ARP cache of the first node;

in response to receiving the unicast send message, by a second virtual network device of the second node, if the destination address is local to the second node, then forwarding, by the second virtual network device of the second node, the unicast send message to a network layer of the second node; and in response to receiving the unicast send message, by the second virtual network device of the second node, if the destination address is not local then forwarding the unicast send message to another destination port of a third node.

5. A system in communication with a plurality of nodes having a plurality of ports in a switchless network, the system comprising:

a memory of a node; and a processor of the node, the processor coupled to the memory, wherein the processor performs operations, the operations comprising:

executing a computer program that includes a first field that denotes a hop count and a second field that denotes an iteration number in an Address Resolution Protocol (ARP) entry of an ARP protocol, wherein the ARP entry in which the first field that denotes the hop count and the second field that denotes the iteration number are included also includes a third field that denotes a destination port;

maintaining communication of the node in the switchless network via point-to-point connections of the plurality of nodes having the plurality of ports; and performing; ARP announcements, via a virtual network device of the node, periodically or in response to an occurrence of a change in the node, for communications among the plurality of nodes in the switchless network, by:

populating data in the first field that denotes the hop count in an ARP entry maintained in an ARP cache that comprises a section of the memory of the node, wherein an announcer of an ARP announcement sets the hop count to zero;

populating data in the second field that denotes the iteration number in the ARP entry maintained in the ARP cache that comprises the section of the memory of the node, wherein each next ARP announcement increments the iteration number by one;

populating data in the third field that denotes the destination port in the ARP entry maintained in the ARP cache that comprises the section of the memory of the node, wherein each ARP announcement is sent to a single network address, and wherein ARP requests are not performed for communications among the plurality of nodes;

determining by the virtual network device that the ARP cache needs to be updated; and in response to determining by the virtual network device that the ARP cache needs to be updated, recording a new ARP entry in which the new ARP entry includes the destination port, the hop count and the iteration number, and an ARP announcement is sent to all other ports with the hop count increased by one wherein the virtual network device is a first virtual network device, wherein the node is a first node, wherein each node of the plurality of nodes has in addition to the ARP cache, a multicast cache of multicast addresses to handle multicast send messages, and loops are avoided in handling of the multicast send messages via an iteration number associated with the multicast addresses, and wherein handling of multicast send messages while performing the ARP announcements comprises:

performing a multicast send message comprising a packet by the first virtual network device of the first node, by updating a first multicast cache of the first node and incrementing the iteration number, and transmitting the multicast send message over all local ports of the first node;

in response to receiving, the multicast send message by a second node, if an entry is found in a second multicast cache of the second node that the iteration of the multicast send message has already been received, stopping processing of the received multicast send message; and in response to receiving, the multicast send message by the second node, if no entry is found in the second multicast cache of the second node that the iteration of the multicast send message has already been received, then updating an entry in the second multicast cache, passing the multicast send to a network layer of the second node, and forwarding the multicast send message over all other ports of the second node.

6. The system of claim 5, wherein the change in the node that causes the performing of the ARP announcements comprise at least one of a port down event, a port up event, or a boot event.

7. The system of claim 6, wherein the ARP announcements are also performed in response of other ARP announcements that signal a node change, to inform changed nodes about paths to local addresses.

8. The system of claim 5, wherein handling of unicast send messages while performing the ARP announcements comprises:
- transmitting by the first virtual network device of the first node, an unicast send message comprising a packet to a destination port of a second node found in an ARP entry, in response to locating a destination address in an ARP cache of the first node;
- in response to receiving the unicast send message, by a second virtual network device of the second node, if the destination address is local to the second node, then forwarding, by the second virtual network device of the second node, the unicast send message to a network layer of the second node; and
- in response to receiving the unicast send message, by the second virtual network device of the second node, if the destination address is not local then forwarding the unicast send message to another destination port of a third node.

9. A computer program product, the computer program product comprising a computer readable storage medium having computer readable program code embodied therewith, the computer readable program code configured to perform operations, the operations comprising:
- executing a computer program that includes a first field that denotes a hop count and a second field that denotes an iteration number in an Address Resolution Protocol (ARP) entry of an ARP protocol, wherein the ARP entry in which the first field that denotes the hop count and the second field that denotes the iteration number are included also includes a third field that denotes a destination port;
- maintaining communication of a node in a switchless network via point-to-point connections of a plurality of nodes having a plurality of ports; and
- performing, ARP announcements, via a virtual network device of the node, periodically or in response to an occurrence of a change in the node, for communications among the plurality of nodes in the switchless network, by:
  - populating data in the first field that denotes the hop count in an ARP entry maintained in an ARP cache that comprises a section of a memory of the node, wherein an announcer of an ARP announcement sets the hop count to zero;
  - populating data in the second field that denotes the iteration number in the ARP entry maintained in the ARP cache that comprises the section of the memory of the node, wherein each next ARP announcement increments the iteration number by one;
  - populating data in the third field that denotes the destination port in the ARP entry maintained in the ARP cache that comprises the section of the memory of the node, wherein each ARP announcement is sent to a single network address, and wherein ARP requests are not performed for communications among the plurality of nodes;
- determining by the virtual network device that the ARP cache needs to be updated; and
- in response to determining by the virtual network device that the ARP cache needs to be updated, recording a new ARP entry in which the new ARP entry includes the destination port, the hop count and the iteration number, and an ARP announcement is sent to all other ports with the hop count increased by one, wherein the virtual network device is a first virtual network device, wherein the node is a first node, wherein each node of the plurality of nodes has in addition to the ARP cache, a multicast cache of multicast addresses to handle multicast send messages, and loops are avoided in handling of the multicast send messages via an iteration number associated with the multicast addresses, and herein handling of multicast send messages while performing the ARP announcements comprises:
  - performing a multicast send message comprising a packet by the first virtual network device of the first node, by updating a first multicast cache of the first node and incrementing the iteration number, and transmitting the multicast send message over all local ports of the first node;
  - in response to receiving, the multicast send message by a second node, if an entry is found in a second multicast cache of the second node that the iteration of the multicast send message has already been received, then stopping processing of the received multicast send message; and
  - in response to receiving, the multicast send message by the second node, if no entry is found in the second multicast cache of the second node that the iteration of the multicast send message has already been received, then updating an entry in the second multicast cache, passing the multicast send to a network layer of the second node and forwarding the multicast send message over all other ports of the second node.

10. The computer program product of claim 9, wherein the change in the node that causes the performing of the ARP announcements comprise at least one of a port down event, a port up event, or a boot event.

11. The computer program product of claim 10, wherein the announcer of the ARP announcements sets the hop count to zero, and each subsequent ARP announcements increments the iteration number by one, and wherein the ARP announcements are also performed in response of other ARP announcements that signal a node change, to inform changed nodes about paths to local addresses.

12. The computer program product of claim 9, wherein handling of unicast send messages while performing the ARP announcements comprises:
- transmitting by the first virtual network device of the first node, an unicast send message comprising a packet to a destination port of a second node found in an ARP entry, in response to locating a destination address in an ARP cache of the first node;
- in response to receiving the unicast send message, by a second virtual network device of the second node, if the destination address is local to the second node, then forwarding, by the second virtual network device of the second node, the unicast send message to a network layer of the second node; and
- in response to receiving the unicast send message, by the second virtual network device of the second node, if the destination address is not local then forwarding the unicast send message to another destination port of a third node.

* * * * *